P. H. STAPLEY.
SELF LUBRICATING PISTON FOR AIR PUMPS.
APPLICATION FILED MAR. 10, 1919.
1,306,640.
Patented June 10, 1919.
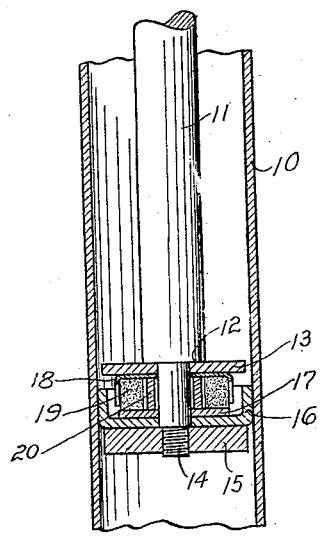
Fig. 1
Fig. 2
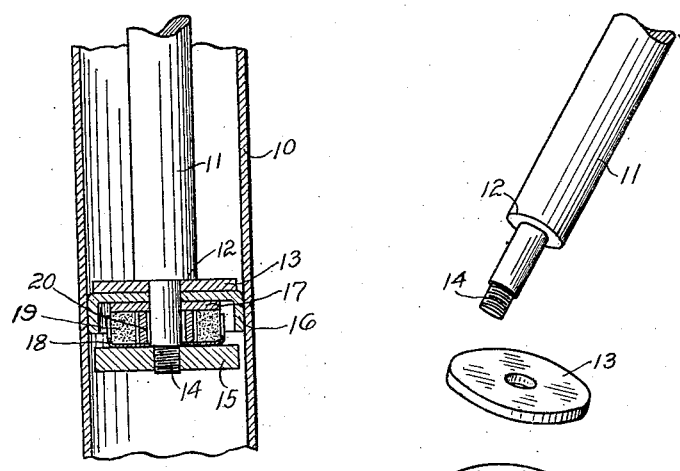
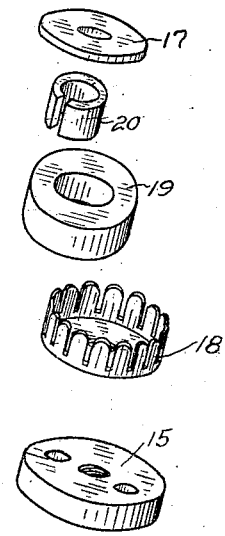
Fig. 3
INVENTOR
Philip H. Stapley
BY
A. M. Wooster
ATTORNEY

UNITED STATES PATENT OFFICE.

PHILIP H. STAPLEY, OF MILFORD, CONNECTICUT, ASSIGNOR TO COE, STAPLEY MANUFACTURING CORPORATION, OF BRIDGEPORT, CONNECTICUT, A CORPORATION OF CONNECTICUT.

SELF-LUBRICATING PISTON FOR AIR-PUMPS.

1,306,640.	Specification of Letters Patent.	Patented June 10, 1919.

Application filed March 10, 1919. Serial No. 281,662.

*To all whom it may concern:*

Be it known that I, PHILIP H. STAPLEY, a citizen of the United States, residing at 54 North street, Milford, county of New Haven, State of Connecticut, have invented an Improvement in Self-Lubricating Pistons for Air-Pumps, of which the following is a specification.

This invention has for its object to provide a simple, inexpensive and thoroughly practical self lubricating piston, especially adapted for use in air pumps, as automobile and bicycle pumps.

With these and other objects in view I have devised the novel piston which I will now describe referring to the accompanying drawing forming a part of this specification and using reference characters to indicate the several parts.

Figure 1 is a sectional view illustrating the construction and operation of my novel piston;

Fig. 2 a similar view illustrating a variant form of the invention; and

Fig. 3 is a view showing the parts disassembled and in perspective.

10 denotes a cylinder, as the cylinder of an air pump, and 11 the piston rod, the end of which is reduced leaving a shoulder 12 against which a metallic washer 13 rests, and the end of which is threaded, as at 14, for engagement by a nut 15. 16 denotes the usual cup shaped flexible piston washer within which lies a metallic washer 17.

The special purpose of the invention is to provide means for keeping the flexible washer just sufficiently lubricated to prevent it from drying and cause it to retain its flexibility and efficiency for a long period of time, and of course without waste of the lubricating material. This I effect by providing within the cup of the flexible washer a grease basket 18 which carries a ring shaped cake of solid grease, indicated by 19. In the hole in the cake of grease and between the bottom of the grease basket and washer 17, I place a spacer 20 which prevents compression of the grease cake, when nut 15 is tightened up. The grease basket is blanked out and formed from sheet metal and is made sufficiently open to permit grease in small quantities to escape therefrom when the parts are slightly heated.

The mode of assembling will be readily understood from the drawing. In use the friction caused by the movement of the piston washer over the wall of the cylinder will heat and melt the grease cake slightly and slight quantities of the grease will pass to the flexible washer keeping it just sufficiently lubricated to preserve its flexibility and efficiency. This lubrication will continue for a long period of time and without waste of grease, as the flexible washer does not become saturated with grease but just sufficient grease passes to it to keep it effectively lubricated. In practice, on the return stroke, the flange of the flexible washer will be moved into contact with the contiguous washer or nut. In the form illustrated in Fig. 1, it will engage nut 15, and in the form illustrated in Fig. 2 it will engage washer 13. This engagement of the flange of the flexible washer with a nut or metallic washer assists in preventing waste of grease. It will be noted that nut 15 in Fig. 1 and washer 13 in Fig. 2 are made relatively large for this purpose.

Having thus described my invention, I claim:

1. A self lubricating piston comprising a piston rod, a metallic washer thereon, a flexible piston washer lying against the metallic washer, a ring shaped grease cake, a basket therefor, a spacer within the basket, and a nut by which the parts are retained in place.

2. A self lubricating piston comprising a flexible piston washer, a metallic washer within the flexible washer, a ring shaped grease cake, a basket therefor, and a spacer between the bottom of the basket and the metallic washer.

3. A self lubricating piston comprising a piston rod having a shoulder, a metallic washer resting against the shoulder, a second metallic washer, a flexible piston washer lying between said metallic washers, a ring shaped grease cake, a basket therefor, and a spacer between the bottom of the basket and the second metallic washer.

4. The combination with a piston rod, of a flexible piston washer, a metallic washer within the flexible washer, a ring shaped grease cake, a basket therefor, and a spacer between the bottom of the basket and the metallic washer.

5. The combination with a piston rod, of a cup shaped flexible piston washer, a grease cake, a basket therefor, and a nut on the piston rod which coöperates with the flange of the flexible washer, on the return stroke, to prevent waste of grease.

In testimony whereof I affix my signature.

PHILIP H. STAPLEY.

Copies of this patent may be obtained for five cents each, by addressing the "Commissioner of Patents, Washington, D. C."